United States Patent
Terada et al.

(10) Patent No.: US 11,059,524 B2
(45) Date of Patent: Jul. 13, 2021

(54) VEHICULAR PANEL STRUCTURE

(71) Applicant: TOYOTA JIDOSHA KABUSHIKI KAISHA, Toyota (JP)

(72) Inventors: Shin Terada, Toyota (JP); Hiroyuki Kurokawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 849 days.

(21) Appl. No.: 15/843,473

(22) Filed: Dec. 15, 2017

(65) Prior Publication Data

US 2018/0170451 A1 Jun. 21, 2018

(30) Foreign Application Priority Data

Dec. 21, 2016 (JP) .............................. JP2016-248298
Mar. 9, 2017 (JP) .............................. JP2017-045398

(51) Int. Cl.
*B62D 27/02* (2006.01)
*B62D 25/06* (2006.01)
*B60J 5/04* (2006.01)

(52) U.S. Cl.
CPC ............ *B62D 27/026* (2013.01); *B60J 5/045* (2013.01); *B62D 25/06* (2013.01)

(58) Field of Classification Search
CPC .. Y10T 403/472; B62D 27/026; B62D 25/06; B60J 5/045; F16B 5/04; F16B 19/10; F16B 2019/1009; F16B 2019/1018
See application file for complete search history.

(56) References Cited

U.S. PATENT DOCUMENTS

| | | | |
|---|---|---|---|
| 3,772,957 A * | 11/1973 | Newton | F16B 11/006 411/15 |
| 4,311,744 A | 1/1982 | Watanabe | |
| 8,827,588 B2 * | 9/2014 | Inaba | F16B 5/0657 403/408.1 |
| 9,758,197 B2 * | 9/2017 | Seo | B29C 70/865 |
| 9,759,249 B2 * | 9/2017 | Kurokawa | F16B 5/045 |
| 10,065,694 B1 * | 9/2018 | Rompage | B62D 29/008 |
| 10,279,784 B2 * | 5/2019 | Plotzitzka | B60S 5/00 |
| 10,689,036 B2 * | 6/2020 | Stojkovic | B62D 25/04 |

(Continued)

FOREIGN PATENT DOCUMENTS

| | | |
|---|---|---|
| CN | 205244070 U | 5/2016 |
| DE | 102012015183 A1 * | 2/2013 .......... F16B 19/1045 |

(Continued)

*Primary Examiner* — Matthew R McMahon
(74) *Attorney, Agent, or Firm* — Oliff PLC

(57) ABSTRACT

A vehicular panel structure includes a panel, a reinforcement disposed inward of the panel in a vehicle, and mastic that bonds the panel and the reinforcement to each other. The reinforcement is provided with a body portion constituting a middle portion in a longitudinal direction and having a linear expansion coefficient smaller than the linear expansion coefficient of the panel, a connection portion constituting an end portion in the longitudinal direction, and a joining portion allowing the body portion and the connection portion to be joined to each other by a thermosetting adhesive and a fastener. A long hole portion is disposed in the reinforcement and is formed in either the connection portion or the body portion. The fastener is inserted into the long hole portion.

4 Claims, 11 Drawing Sheets

(56) References Cited

U.S. PATENT DOCUMENTS

| | | | | |
|---|---|---|---|---|
| 2008/0272625 A1* | 11/2008 | Paetz | .................. | B60J 10/30 |
| | | | | 296/216.09 |
| 2011/0174424 A1* | 7/2011 | Briault | .................. | E05D 5/023 |
| | | | | 156/91 |
| 2020/0096032 A1* | 3/2020 | Blaski | ................ | F16B 19/1072 |

FOREIGN PATENT DOCUMENTS

| | | | |
|---|---|---|---|
| GB | 2084941 | A | 4/1982 |
| JP | H10-167114 | A | 6/1998 |
| JP | 2008-247189 | A | 10/2008 |
| JP | 2009-126344 | A | 6/2009 |
| JP | 2010-083247 | A | 4/2010 |
| JP | 2010-083248 | A | 4/2010 |

\* cited by examiner

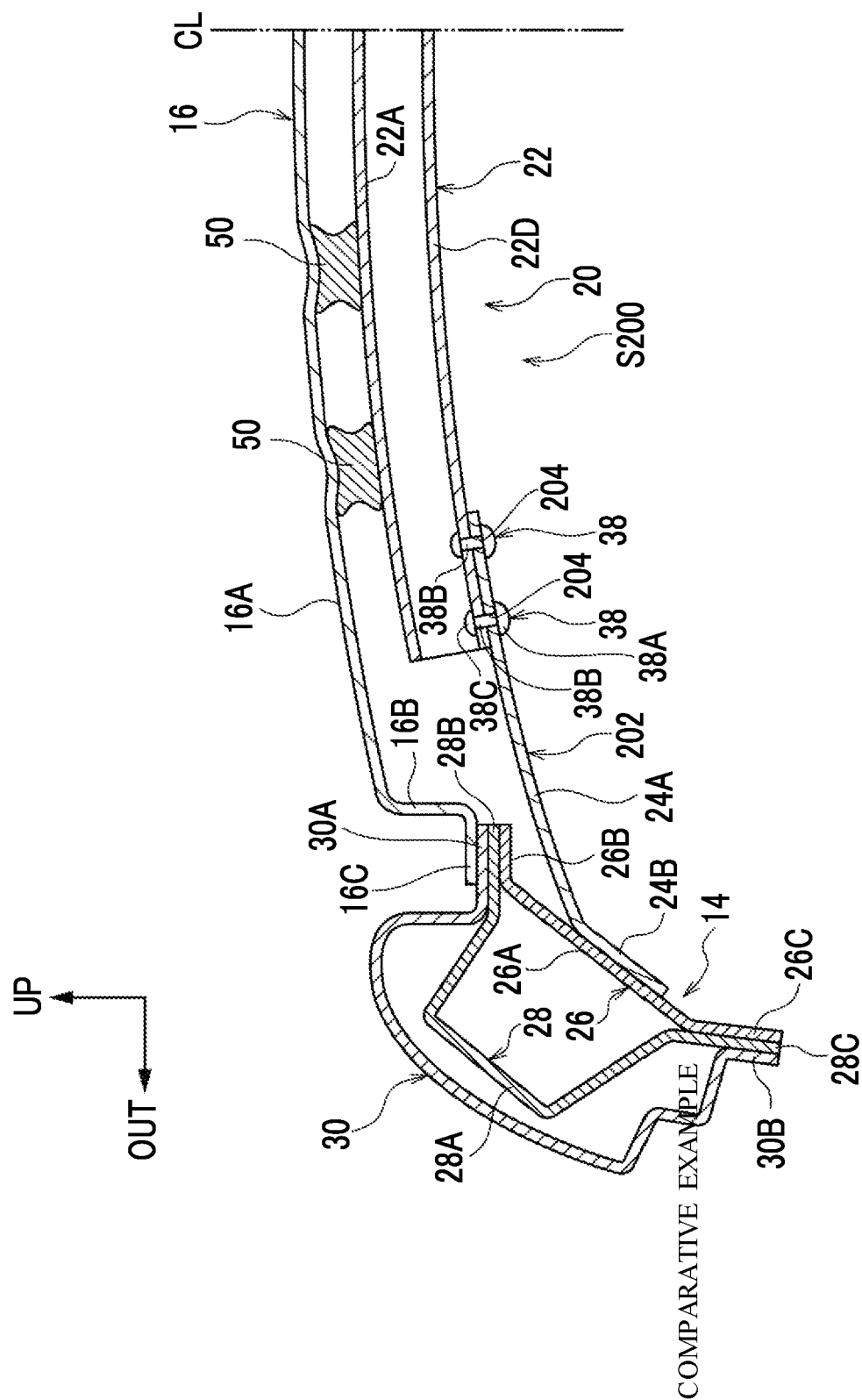

VEHICULAR PANEL STRUCTURE

INCORPORATION BY REFERENCE

The disclosure of Japanese Patent Applications Nos. 2016-248298 filed on Dec. 21, 2016 and 2017-045398 filed on Mar. 9, 2017 including the specifications, drawings and abstracts are incorporated herein by reference in their entireties.

BACKGROUND

1. Technical Field

The present disclosure relates to a vehicular panel structure.

2. Description of Related Art

Japanese Unexamined Patent Application Publication No. 2010-083248 (JP 2010-083248 A) discloses a vehicular roof structure. In the vehicular roof structure disclosed in JP 2010-083248 A, a mastic sealer is disposed between a roof reinforcement and a roof panel and the linear expansion coefficient of the roof reinforcement and the linear expansion coefficient of the roof panel differ from each other. In the vehicular roof structure disclosed in JP 2010-083248 A, fracture of the mastic sealer is suppressed by the roof reinforcement being deformed such that the mastic sealer is pressed against the roof panel as a result of thermal expansion of the roof panel during coating drying. Japanese Unexamined Patent Application Publication No. 2009-126344 (JP 2009-126344 A), in the meantime, discloses a roof structure that is provided with a roof panel and a roof bow. A projection portion is formed in the roof bow. The roof structure absorbs deformation at a time when a vehicle body is returned from a high-temperature state to a normal temperature.

SUMMARY

In the structure that is disclosed in JP 2010-083248 A, mastic sealer shrinkage after the coating drying may result in roof panel surface distortion.

The present disclosure provides a vehicular panel structure with which panel surface distortion attributable to mastic shrinkage can be further suppressed.

An aspect of the present disclosure relates to a vehicular panel structure including a panel constituting a vehicle, an elongated reinforcement disposed inward of the panel in the vehicle and shaped such that the reinforcement protrudes to the panel side or a side opposite to the panel, and mastic that is disposed between the panel and the reinforcement and that bonds the panel and the reinforcement to each other. The reinforcement includes a body portion, a connection portion, and a joining portion. A long hole portion is disposed in the reinforcement. The body portion constitutes a middle portion of the reinforcement in a longitudinal direction. A linear expansion coefficient of the body portion is smaller than a linear expansion coefficient of the panel. The connection portion constitutes an end portion of the reinforcement in the longitudinal direction. The connection portion is joined to the panel directly or indirectly via a member. The joining portion allows the body portion and the connection portion to be joined to each other by a thermosetting adhesive and a fastener. The long hole portion is disposed in either the body portion or the connection portion. The long hole portion is configured for the fastener to be inserted into the long hole portion. The long hole portion is disposed such that a hole becomes longer along the longitudinal direction of the reinforcement.

According to the aspect of the present disclosure, the panel constitutes the vehicle, the elongated reinforcement is disposed inward of the panel in the vehicle, and the elongated reinforcement is shaped such that the reinforcement protrudes to the panel side or the side opposite to the panel. The reinforcement is provided with the body portion and the connection portion. The body portion constitutes the middle portion of the reinforcement in the longitudinal direction and the linear expansion coefficient of the body portion is smaller than the linear expansion coefficient of the panel. The connection portion constitutes the end portion of the reinforcement in the longitudinal direction and the connection portion is joined to the panel directly or indirectly via the member. The joining portion allows the body portion and the connection portion to be joined to each other by the thermosetting adhesive and the fastener. The long hole portion is formed in either the body portion or the connection portion and the long hole portion is relatively long along the longitudinal direction of the reinforcement. The fastener is inserted into the long hole portion. In the configuration described above, the linear expansion coefficient of the body portion is smaller than the linear expansion coefficient of the panel, and thus the panel is more likely to undergo thermal expansion than the body portion during coating heating. During the coating heating, the connection portion follows the thermal expansion of the panel and is relatively moved toward the end portion of the body portion in its longitudinal direction along the long hole portion by the long hole portion being disposed in either the body portion or the connection portion. In addition, the thermosetting adhesive is cured and the connection portion and the body portion are fixed to each other in a state where the connection portion is moved toward the end portion of the body portion in the longitudinal direction. After the coating heating, the thermally expanded panel is cooled and contracted and a force to return the connection portion to its original position acts on the connection portion. As a result, the body portion is deformed toward the panel side. Then, the shrinkage of the mastic between the panel and the reinforcement that is attributable to a decline in temperature can be offset and panel surface distortion can be further suppressed.

In the vehicular panel structure according to the aspect of the present disclosure, the fastener may be a rivet having a head portion and the long hole portion may be disposed on a side of the body portion and the connection portion in contact with the head portion.

According to the aspect of the present disclosure, the long hole portion is disposed on the side of the body portion and the connection portion that is in contact with the head portion of the rivet. As a result, the inner diameter of the long hole portion can be increased in accordance with the diameter of the head portion of the rivet, and thus panel surface distortion can be absorbed even when the panel is significantly expanded and contracted as a result of the coating heating.

In the vehicular panel structure according to the aspect of the present disclosure, the body portion may extend in the longitudinal direction of the reinforcement and a cross section of the body portion orthogonal to the longitudinal direction may be a closed cross section.

According to the aspect of the present disclosure, the cross section of the body portion orthogonal to the longitudinal direction is a closed cross section, and the rigidity of the body portion is higher than usual. As a result, a force to offset the shrinkage of the mastic between the panel and the reinforcement that is attributable to a decline in temperature is improved to become larger than usual.

In the vehicular panel structure according to the aspect of the present disclosure, a linear expansion coefficient of the connection portion may be equivalent to a thermal expansion coefficient of the panel or may be equal to or smaller than the thermal expansion coefficient of the panel.

According to the aspect of the present disclosure, the linear expansion coefficient of the connection portion being "equivalent" to the thermal expansion coefficient of the panel includes a case where the linear expansion coefficient of the connection portion is slightly larger than the thermal expansion coefficient of the panel and a case where the linear expansion coefficient of the connection portion is slightly smaller than the thermal expansion coefficient of the panel as well as a case where the linear expansion coefficient of the connection portion is equivalent to the thermal expansion coefficient of the panel.

When the linear expansion coefficient of the connection portion is larger than the thermal expansion coefficient of the panel and the connection portion is likely to be extended during the coating heating, for example, a difference in length is unlikely to occur between the connection and body portions and the panel, and thus the amount of deformation of the body portion toward the panel side is not ensured with ease. According to the aspect of the present disclosure, in contrast, the linear expansion coefficient of the connection portion is equivalent to the thermal expansion coefficient of the panel or is equal to or smaller than the thermal expansion coefficient of the panel, and thus a difference in length is likely to occur between the connection and body portions and the panel during the coating heating. Accordingly, the amount of deformation of the body portion toward the panel side can be ensured with greater ease in the above-described configuration than in a case where the linear expansion coefficient of the connection portion is larger than the thermal expansion coefficient of the panel.

Panel surface distortion attributable to mastic shrinkage can be further suppressed with the vehicular panel structure according to the aspect of the present disclosure.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 7 is a sectional view illustrating a state after cooling of an upper portion of a vehicle to which a vehicular panel structure according to a comparative example is applied;

DETAILED DESCRIPTION OF EMBODIMENTS

Hereinafter, embodiments of the present disclosure will be described in detail with reference to accompanying drawings. The arrows FR, UP, and OUT that are appropriately shown in each of the drawings represent the front side of a vehicle, the upper side of the vehicle, and the outer side in the width direction of the vehicle, respectively.

First Embodiment

A vehicular panel structure according to a first embodiment will be described below with reference to FIGS. 1 to 6C.

Figure 1:
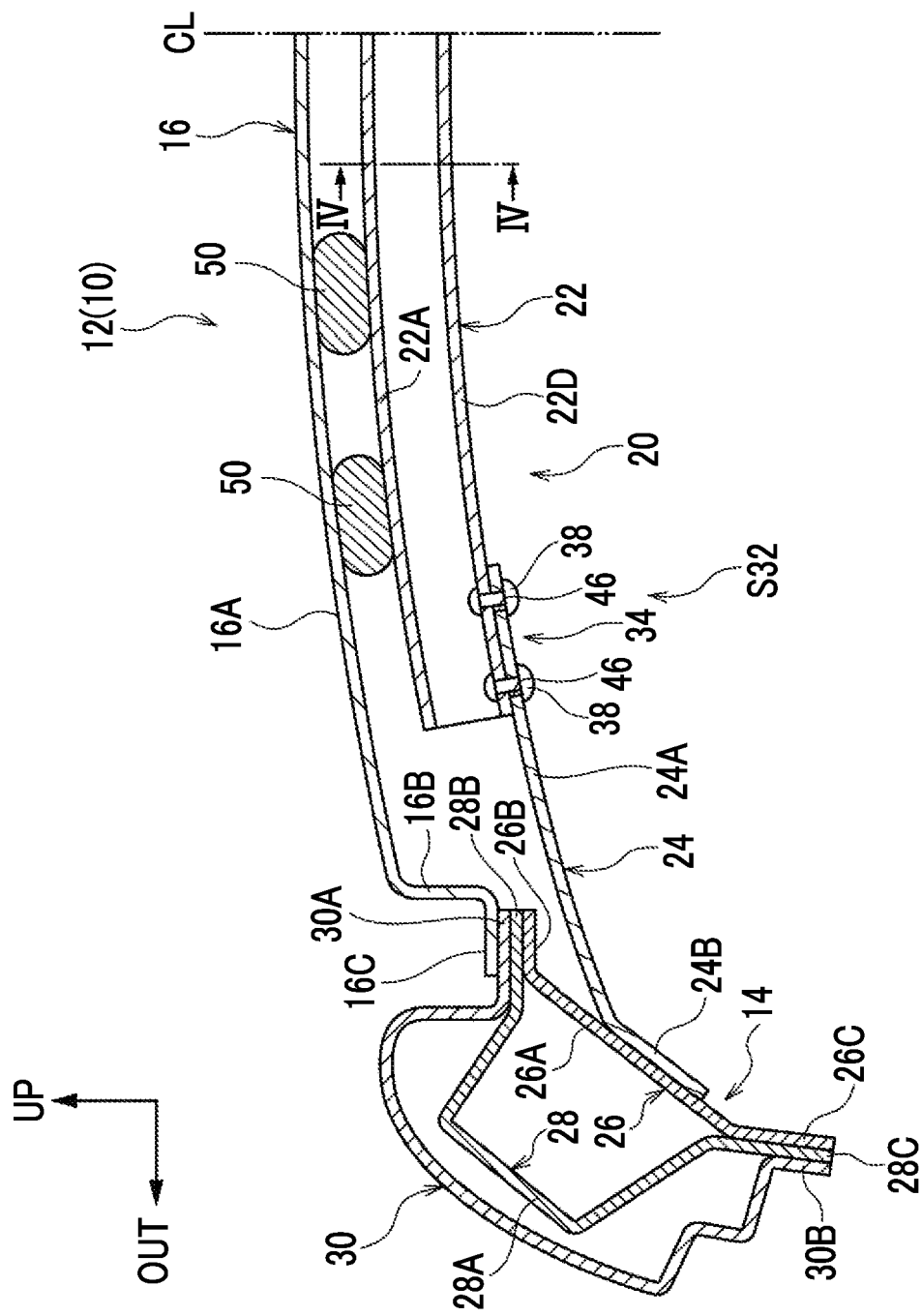
FIG. 1 is a sectional view illustrating an upper portion of a vehicle to which a vehicular panel structure according to a first embodiment is applied.

FIG. 1 is a sectional view illustrating an upper portion 12 of a vehicle 10 to which a vehicular panel structure S32 according to the first embodiment (refer to FIG. 2) is applied. What is illustrated in FIG. 1 is the part of the upper portion 12 of the vehicle 10 that is on the left side in the width direction of the vehicle when the vehicle is seen from the front of the vehicle. The upper portion 12 of the vehicle 10 is bilaterally symmetrical in the width direction of the vehicle, and the right side in the width direction of the vehicle is not illustrated herein.

As illustrated in FIG. 1, a roof side rail 14 is disposed in the end portion of the upper portion 12 of the vehicle 10 that is on the outer side in the width direction of the vehicle. The roof side rail 14 extends substantially in the front-rear direction of the vehicle. Although not illustrated, a pair of the right and left roof side rails 14 is provided, and the roof side rails 14 are respectively disposed in both the end portions of the upper portion 12 in the width direction of the vehicle. A roof panel 16 is disposed in the upper portion 12 of the vehicle 10. The roof panel 16 is a panel disposed like a bridge between the right and left roof side rails 14. The roof panel 16 extends substantially in the width direction of the vehicle and substantially in the front-rear direction of the vehicle. An elongated reinforcement 20 is disposed below the roof panel 16 in the up-down direction of the vehicle.

The reinforcement 20 extends substantially in the width direction of the vehicle. The reinforcement 20 is disposed like a bridge between the right and left roof side rails 14. The reinforcement 20 is provided with a roof reinforcement 22 and a pair of extensions 24. The roof reinforcement 22 is a body portion constituting the middle portion of the reinforcement 20 in its longitudinal direction. The extensions 24 are connection portions constituting its end portions in the longitudinal direction of the reinforcement 20. Although not illustrated, a pair of the right and left extensions 24 is provided, and the extensions 24 are respectively disposed on both the sides of the roof reinforcement 22 in the width direction of the vehicle.

The roof side rail 14 is a vehicle body skeleton member disposed on each side of the roof panel 16. The roof side rail 14 substantially has the front-rear direction of the vehicle as its longitudinal direction. The roof side rail 14 is provided with a roof side rail inner panel (hereinafter, abbreviated as a "rail inner panel") 26 and a roof side rail outer panel (hereinafter, abbreviated as a "rail outer panel") 28. The rail inner panel 26 is disposed on the inner side in the width direction of the vehicle and the rail outer panel 28 is disposed outside the rail inner panel 26 in the width direction of the vehicle. A side outer panel 30 is disposed outside the rail outer panel 28 in the width direction of the vehicle.

The rail inner panel 26 is provided with an inclined portion 26A and an upper flange portion 26B. The inclined portion 26A is disposed such that it has a rising gradient toward the inner side in the width direction of the vehicle. The upper flange portion 26B extends to the inner side in the width direction of the vehicle from the upper end portion of the inclined portion 26A. The rail inner panel 26 is also provided with a lower flange portion 26C that extends obliquely downward substantially to the outer side in the width direction of the vehicle from the lower end portion of the inclined portion 26A.

The rail outer panel 28 is substantially hat-shaped in cross section in sectional view substantially along the up-down direction of the vehicle and the width direction of the vehicle. The rail outer panel 28 is provided with a substantially U-shaped wall portion 28A and an upper flange portion 28B. The wall portion 28A is open inward in the width direction of the vehicle. The upper flange portion 28B extends to the inner side in the width direction of the vehicle from the end portion of the wall portion 28A that is on the inner side in the width direction of the vehicle. The rail outer panel 28 is also provided with a lower flange portion 28C that extends obliquely downward substantially to the outer side in the width direction of the vehicle from the lower end portion of the wall portion 28A that is on the outer side in the width direction of the vehicle.

The upper flange portion 28B of the rail outer panel 28 overlaps the upper surface of the upper flange portion 26B of the rail inner panel 26 and is joined by welding to the upper surface of the upper flange portion 26B of the rail inner panel 26. The lower flange portion 28C of the rail outer panel 28 overlaps the outside surface of the lower flange portion 26C of the rail inner panel 26 and is joined by welding to the outside surface of the lower flange portion 26C of the rail inner panel 26. As a result, the rail outer panel 28 and the rail inner panel 26 constitute a closed cross section. In addition, a flange portion 30A of the side outer panel 30 overlaps the upper flange portion 28B of the rail outer panel 28 and is joined by welding to the upper flange portion 28B of the rail outer panel 28. The flange portion 30A is formed in the end portion of the upper portion of the side outer panel 30 that is on the inner side in the width direction of the vehicle. Furthermore, a flange portion 30B of the side outer panel 30 overlaps the lower flange portion 28C of the rail outer panel 28 and is joined by welding to the lower flange portion 28C of the rail outer panel 28. The flange portion 30B is formed in the lower end portion of the side outer panel 30.

The roof panel 16 is provided with an upper wall portion 16A, a vertical wall portion 16B, and a flange portion 16C. The upper wall portion 16A is curved such that its intermediate portion in the width direction of the vehicle is closer to the upper side of the vehicle than both of its end portions in the width direction of the vehicle. The vertical wall portion 16B extends to the lower side of the vehicle from the end portion of the upper wall portion 16A that is on the outer side in the width direction of the vehicle. The flange portion 16C is bent to the outer side in the width direction of the vehicle from the lower end portion of the vertical wall portion 16B. The flange portion 16C of the roof panel 16 overlaps the upper surface of the flange portion 30A of the side outer panel 30 and is joined by welding to the upper surface of the flange portion 30A of the side outer panel 30.

Figure 4:
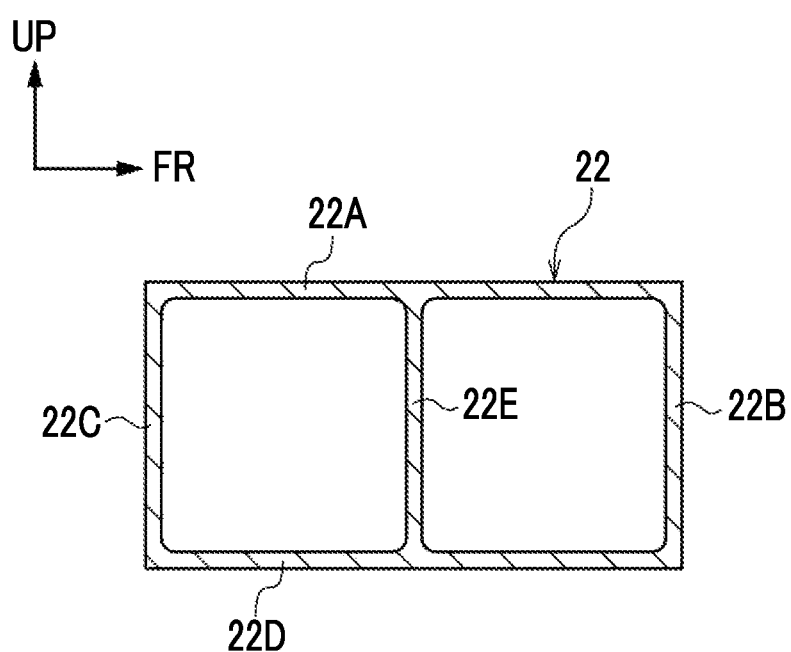
FIG. 4 is a cross-sectional view of the roof reinforcement taken along line IV-IV of FIG. 1.

The roof reinforcement 22 is disposed such that it substantially has the width direction of the vehicle as its longitudinal direction. As illustrated in FIG. 4, the roof reinforcement 22 is a substantially rectangular member and its cross section orthogonal to the longitudinal direction is a closed cross section. More specifically, the roof reinforcement 22 is provided with an upper wall portion 22A, a pair of front and rear side wall portions 22B, 22C, and a lower wall portion 22D. The front side wall portion 22B extends to the lower side of the vehicle from the front end portion of the upper wall portion 22A in the front-rear direction of the vehicle. The rear side wall portion 22C extends to the lower side of the vehicle from the rear end portion of the upper wall portion 22A in the front-rear direction of the vehicle. The lower wall portion 22D connects the lower end portions of the side wall portions 22B, 22C to each other. A partition wall 22E is disposed like a bridge between the intermediate portions of the upper wall portion 22A and the lower wall portion 22D in the front-rear direction of the vehicle. The partition wall 22E connects the upper wall portion 22A and the lower wall portion 22D, which are disposed substantially along the up-down direction of the vehicle, to each other.

As illustrated in FIG. 1, an elongated plate-shaped member constitutes the extension 24. The extension 24 is provided with a wall portion 24A. The wall portion 24A is joined to the lower side of the lower wall portion 22D of the roof reinforcement 22 and is disposed obliquely downward from the outer side of the lower wall portion 22D in the width direction of the vehicle. The extension 24 is also provided with a bent portion 24B. The bent portion 24B is obliquely bent to the lower side of the vehicle along the inclined portion 26A of the rail inner panel 26 from the end portion of the wall portion 24A that is on the outer side in the width direction of the vehicle. The bent portion 24B is disposed in surface contact with the inclined portion 26A of the rail inner panel 26 and is joined by welding or the like to the inclined portion 26A of the rail inner panel 26. As a result, the extension 24 that constitutes the longitudinal end portion of the reinforcement 20 is joined to the roof panel 16 via the roof side rail 14 and the flange portion 30A of the side outer panel 30. In other words, the extension 24 is indirectly joined to the roof panel 16 via the members in the vehicular panel structure S32 according to the first embodiment.

The end portion of the wall portion 24A of the extension 24 that is on the inner side in the width direction of the vehicle is joined to the lower wall portion 22D of the roof reinforcement 22 by a joining portion 34. The reinforcement 20 is shaped such that it protrudes toward the roof panel 16 in a state where the roof reinforcement 22 in its middle portion in the width direction of the vehicle and the extension 24 in its end portion on the outer side in the width direction of the vehicle are joined to each other. In the first embodiment, the reinforcement 20 is shaped such that it is convexly curved toward the roof panel 16.

Figure 2:
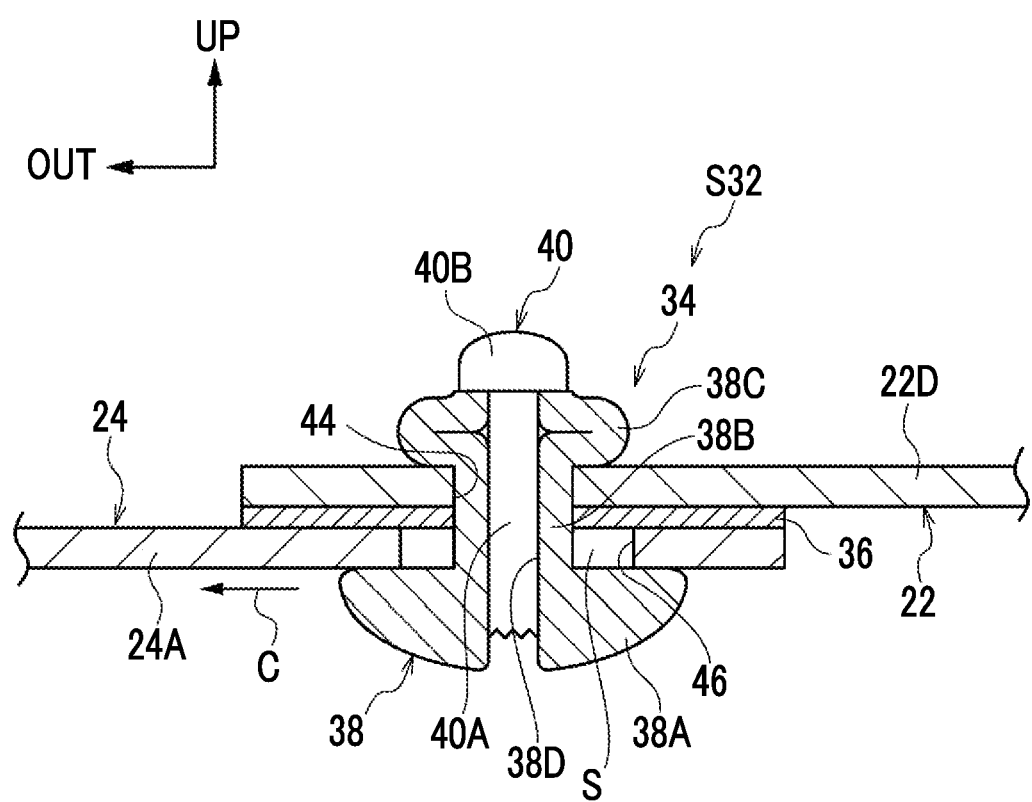
FIG. 2 is a sectional view illustrating a joining portion for an extension and a roof reinforcement used in the vehicular panel structure according to the first embodiment.

As illustrated in FIG. 2, the joining portion 34 is provided with a bonding portion 36 and a rivet 38 as a fastener. A thermosetting adhesive disposed between the extension 24 and the roof reinforcement 22 constitutes the bonding portion 36. The extension 24 and the roof reinforcement 22 are joined to each other by the rivet 38. The thermosetting adhesive that constitutes the bonding portion 36 is cured by heating during electrodeposition coating (ED coating). The extension 24 and the roof reinforcement 22 are bonded to each other by the bonding portion 36 by the thermosetting adhesive being cured by the heating.

The roof reinforcement 22 is provided with a circular hole portion 44. A shaft portion 38B (described later) of the rivet 38 is inserted into the hole portion 44. A long hole portion 46 is disposed in the extension 24. The shaft portion 38B of the rivet 38 is inserted into the long hole portion 46. The rivet 38 is provided with a large-diameter head portion 38A, the shaft portion 38B extending from the head portion 38A, and a deformation portion 38C formed in the end portion of the shaft portion 38B that is on the side opposite to the head portion 38A. A through-hole 38D is formed in the central portion of the rivet 38. A shaft 40A of a second member 40 is inserted into the through-hole 38D. A pushing portion 40B is formed at the tip of the shaft 40A. The pushing portion 40B is larger in diameter than the shaft 40A. By the shaft 40A being retracted from the side opposite to the through-hole 38D by a jig (not illustrated), the second member 40 caulks the tip of the shaft portion 38B with the pushing portion 40B and forms the deformation portion 38C. As a result, the roof reinforcement 22 and the extension 24 are sandwiched between the head portion 38A and the deformation portion 38C of the rivet 38 and the roof reinforcement 22 and the extension 24 are joined to each other.

In the vehicular panel structure S32, a plurality of the rivets 38 is disposed along the width direction of the vehicle, which is the longitudinal direction of the extension 24. In the present embodiment, the number of the rivets 38 is two. A plurality of (two or so) rivets 38 (not illustrated) is also disposed in the direction that is orthogonal to the longitudinal direction of the extension 24. The vehicular panel structure S32 goes through an ED coating process after the roof reinforcement 22 and the extension 24 are joined to each other by the rivets 38.

Figure 3:
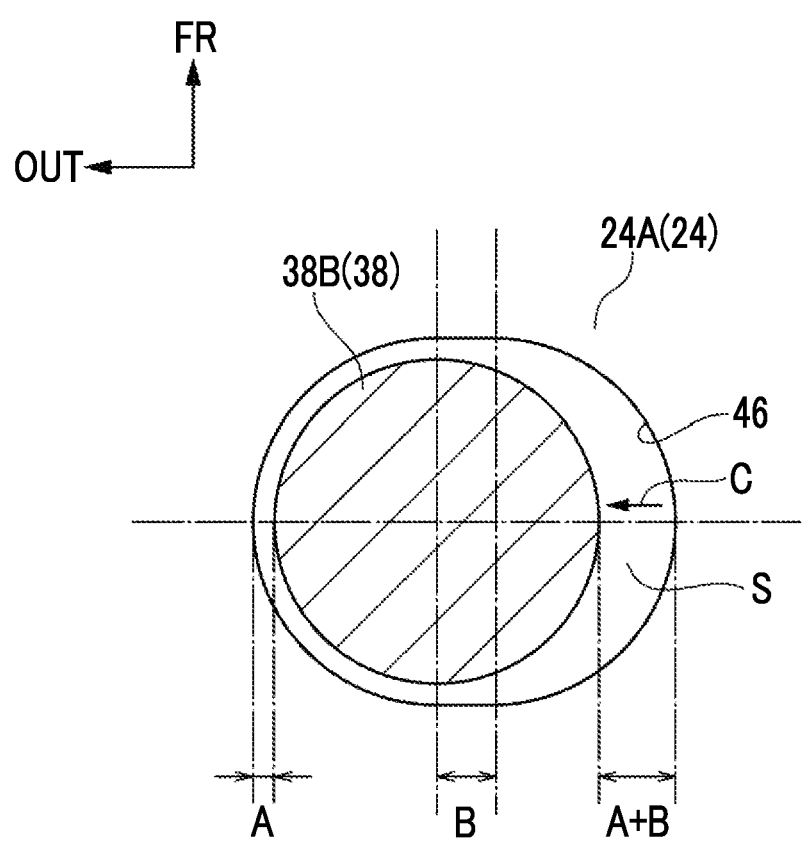
FIG. 3 is a sectional view illustrating a dimensional relationship between a long hole portion of the extension and a shaft portion of a rivet in the joining portion.

The long hole portion 46 of the extension 24 and the shaft portion 38B of the rivet 38 that is inserted into the long hole portion 46 are illustrated in FIG. 3. The through-hole 38D in the shaft portion 38B and the shaft 40A that is inserted into the through-hole 38D are not illustrated in FIG. 3. As illustrated in FIG. 3, the long hole portion 46 is formed such that it has its length along the longitudinal direction of the extension 24. In other words, the part of the long hole portion 46 that is large in inner diameter extends along the longitudinal direction of the extension 24 (refer to FIG. 2). A clearance S is formed between the inner wall of the long hole portion 46 and the shaft portion 38B. The clearance S between the part of the long hole portion 46 that is large in inner diameter and the shaft portion 38B is provided with gaps A on both sides of the shaft portion 38B for absorbing a dimensional variation (positional variation) and a gap B for allowing a movement (that is, sliding) of the extension 24 during ED coating drying. The gap B allows the distortion of the roof panel 16 during the ED coating drying to be sufficiently absorbed by allowing the extension 24 to slide in the arrow C direction (to the outer side in the width direction of the vehicle) with respect to the roof reinforcement 22 (refer to FIG. 2) during the ED coating drying. The clearance S between the part of the long hole portion 46 that is small in inner diameter and the shaft portion 38B is the gap A on both sides of the shaft portion 38B for absorbing a dimensional variation. As a result, the extension 24 extends along the longitudinal direction and the long hole portion 46 relatively slides in the arrow C direction (to the outer side in the width direction of the vehicle) with respect to the shaft portion 38B of the rivet 38 during the ED coating drying (that is, coating heating).

The gap A for absorbing the dimensional variation (positional variation) is, for example, approximately 0.1 mm to 0.3 mm. The gap B for absorbing the distortion during the ED coating drying is, for example, approximately 1.0 mm. The head portion 38A of the rivet 38 is in contact with the extension 24 side. The part of the long hole portion 46 that is large in inner diameter is smaller in diameter than the head portion 38A of the rivet 38.

In the vehicular panel structure S32, the long hole portion 46 is not disposed in the roof reinforcement 22 and the long hole portion 46 is disposed in the extension 24, which is disposed on the side that is in contact with the head portion 38A of the rivet 38.

In the vehicular panel structure S32, mastic 50 is disposed in a plurality of places between the roof panel 16 and the upper wall portion 22A of the roof reinforcement 22 so that the roof panel 16 and the upper wall portion 22A of the roof reinforcement 22 are bonded to each other. The places where the mastic 50 is disposed are spaced apart from one another along the width direction of the roof panel 16, which is the width direction of the vehicle. In the present embodiment, the number of the places is four. The mastic 50 is shrunk by cooling after the ED coating drying.

The linear expansion coefficient of the roof reinforcement 22 is smaller than the linear expansion coefficient of the roof panel 16. The roof reinforcement 22 according to the first embodiment is made of carbon fiber reinforced plastic (CFRP) or the like. The linear expansion coefficient of the CFRP is approximately 4 $[10^{-6}/°$ C.]. The roof panel 16 according to the first embodiment is formed of a steel plate or the like, and the linear expansion coefficient of the steel plate is approximately 17.5 $[10^{-6}/°$ C.]. A plurality of the long hole portions 46 is formed in the extension 24, and the rivets 38 are inserted into the respective long hole portions 46. The part of each long hole portion 46 that is large in inner diameter is in the longitudinal direction of the extension 24 (direction in which a difference from the roof panel 16 occurs in terms of linear expansion).

The linear expansion coefficient of the extension 24 in the vehicular panel structure S32 is equivalent to the thermal expansion coefficient of the roof panel 16 or is equal to or smaller than the thermal expansion coefficient of the roof panel 16. The extension 24 according to the first embodiment is made of steel or the like, and the linear expansion coefficient of the steel plate is approximately 17.5 $[10^{-6}/°$ C.].

Hereinafter, the action and effect of the vehicular panel structure S32 according to the first embodiment will be described.

Figure 6A:
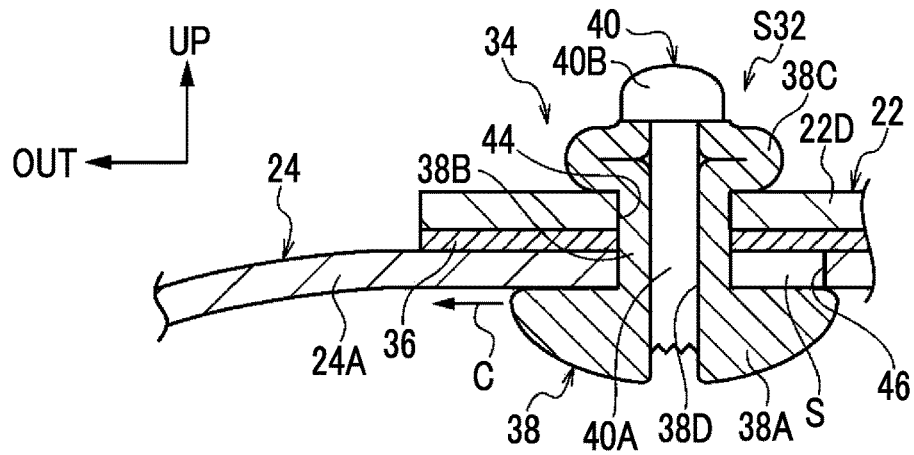
FIG. 6A is a sectional view illustrating an initial state of the joining portion for the extension and the roof reinforcement used in the vehicular panel structure according to the first embodiment.

In the vehicular panel structure S32, the long hole portion 46 is formed in the extension 24 as illustrated in FIG. 6A.

The thermosetting adhesive that is yet to be cured is applied between the extension 24 and the roof reinforcement 22, and the thermosetting adhesive constitutes the bonding portion 36 by being heated. The extension 24 and the roof reinforcement 22 are joined to each other by the rivet 38 in a state where the shaft portion 38B of the rivet 38 is inserted into the long hole portion 46 from the extension 24 side and the shaft portion 38B of the rivet 38 is inserted into the hole portion 44 of the roof reinforcement 22. More specifically, the extension 24 and the roof reinforcement 22 are joined to each other by the head portion 38A of the rivet 38 being brought into contact with the extension 24 side and the roof reinforcement 22 and the extension 24 being sandwiched by the head portion 38A and the deformation portion 38C formed by the caulking of the rivet 38. In the state described above, the clearance S is formed between the shaft portion 38B and the long hole portion 46 of the extension 24 on the inner side of the shaft portion 38B of the rivet 38 in the width direction of the vehicle.

Figure 6B:
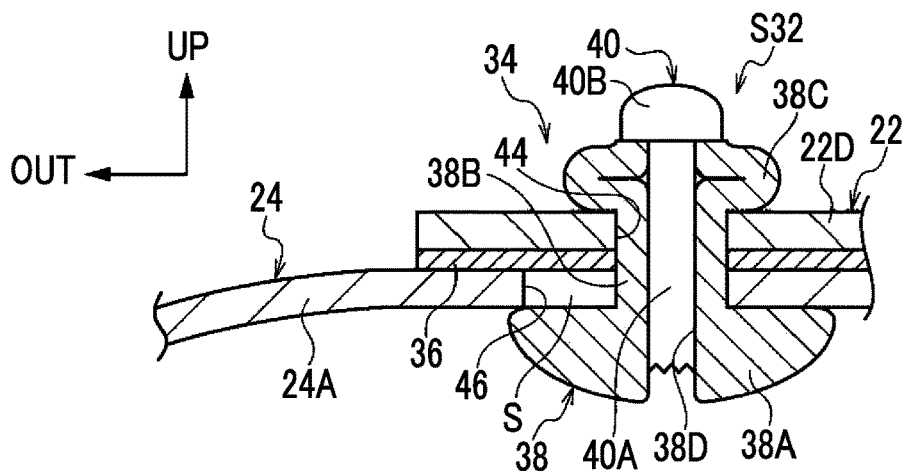
FIG. 6B is a sectional view illustrating a state during the coating heating of the joining portion for the extension and the roof reinforcement used in the vehicular panel structure according to the first embodiment.

The ED coating process is performed after the extension 24 and the roof reinforcement 22 are joined to each other by the rivets 38 as illustrated in FIG. 6B. In the vehicular panel structure S32, the linear expansion coefficient of the roof reinforcement 22 is smaller than the linear expansion coefficient of the roof panel 16. During the ED coating drying (that is, during the coating heating), the roof side rail 14 moves toward the outer side in the width direction of the vehicle as a result of the extension (thermal expansion) of the roof panel 16. As a result, the extension 24 is pulled to the outer side in the width direction of the vehicle by following the extension (thermal expansion) of the roof panel 16 and the extension 24 is relatively slid (misaligned) to the outer side in the width direction of the vehicle (refer to the arrow C in FIG. 6A) with respect to the rivet 38 as illustrated in FIG. 6B. Since the linear expansion coefficient of the extension 24 is equivalent to the thermal expansion coefficient of the roof panel 16, the extension 24 is extended along the width direction of the vehicle as is the case with the roof panel 16. Accordingly, the clearance S between the shaft portion 38B and the long hole portion 46 of the extension 24 is disposed on the outer side of the shaft portion 38B of the rivet 38 in the width direction of the vehicle. In this state where the extension 24 is slid to the outer side in the width direction of the vehicle and the roof panel 16 and the extension 24 are extended, the thermosetting adhesive between the extension 24 and the roof reinforcement 22 is cured by heat during the ED coating drying (that is, during the coating heating). As a result, the extension 24 and the roof reinforcement 22 are fixed to each other by the cured bonding portion 36.

Figure 5:
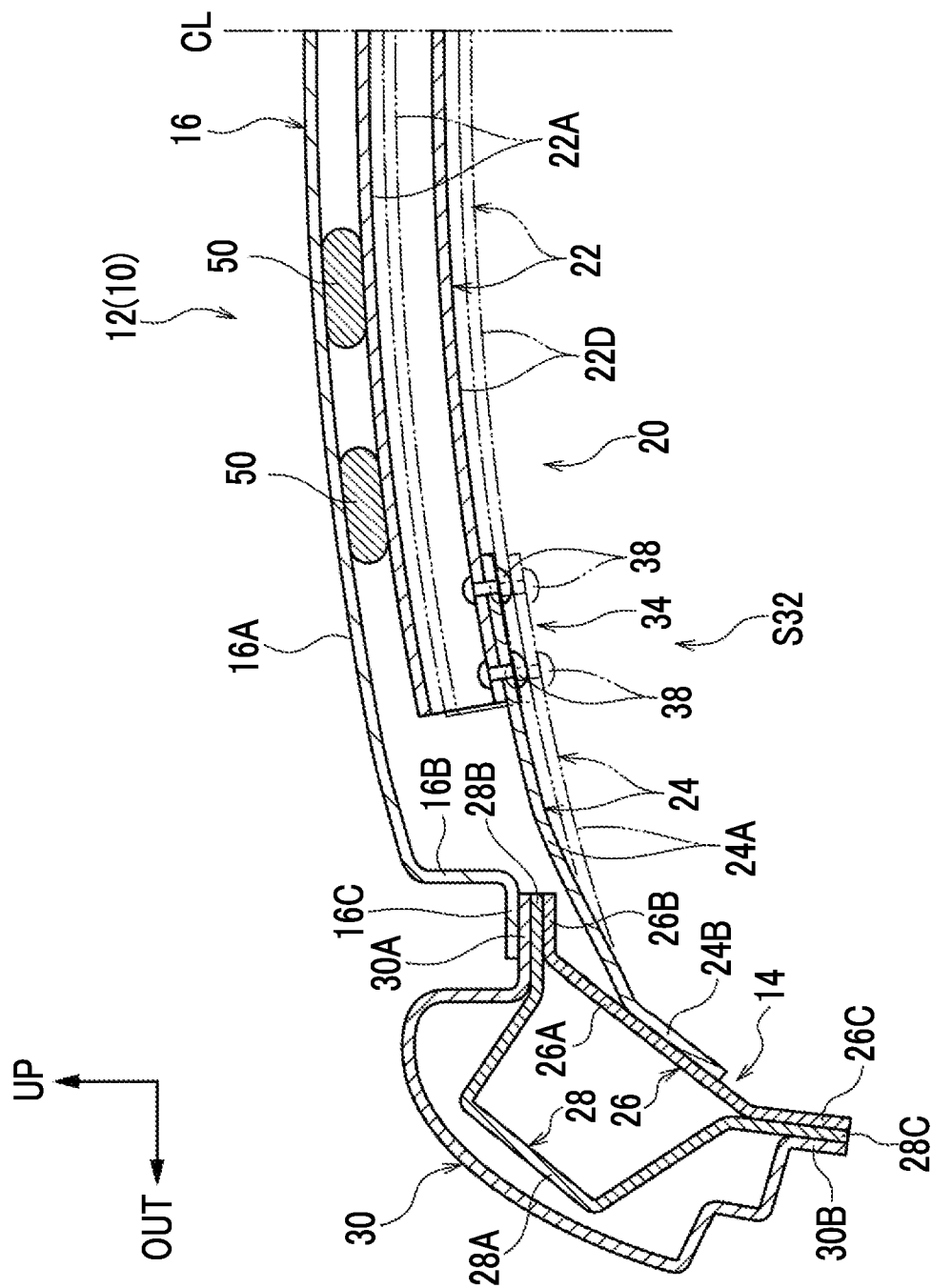
FIG. 5 is a sectional view illustrating a state where the extension and the roof reinforcement are deformed during cooling of the vehicular panel structure according to the first embodiment after coating heating.
Figure 6C:
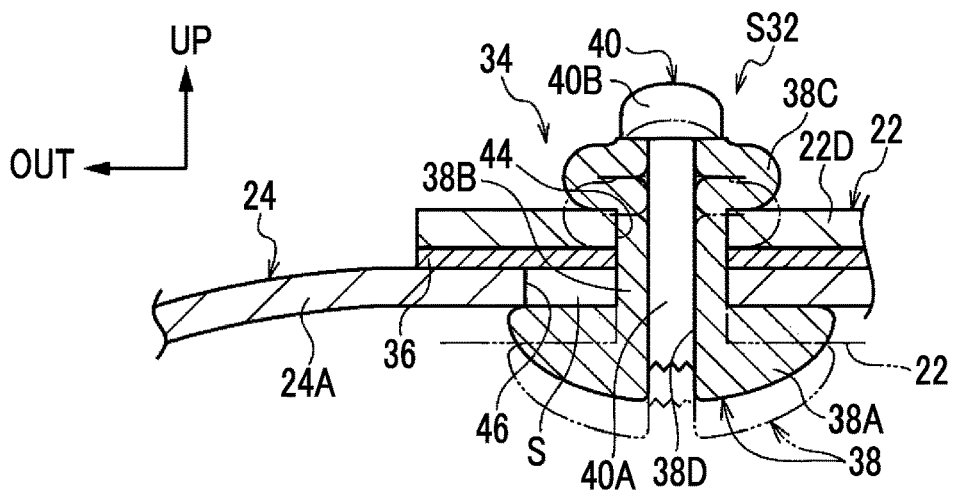
FIG. 6C is a sectional view illustrating a state after the cooling of the joining portion for the extension and the roof reinforcement used in the vehicular panel structure according to the first embodiment.

After the cooling, the thermally expanded roof panel 16 is contracted, the extension 24 shows a tendency to return to its original position, and the extension 24 and the roof reinforcement 22 are deformed upward (refer to FIG. 5), that is, toward the roof panel 16, to the same extent as the remaining line length with respect to the roof panel 16 as illustrated in FIG. 6C. As a result, the shrinkage of the mastic 50 that is attributable to a decline in temperature can be offset and the surface distortion that arises in the roof panel 16 can be further suppressed in vehicular panel structure S32 as illustrated in FIG. 5. In the first embodiment, the roof reinforcement 22 is deformed toward the roof panel 16 by, for example, 1.0 mm to 3.0 mm.

In the above-described vehicular panel structure S32, the long hole portions 46 are disposed in the extension 24 and the rivets 38 are inserted into the respective long hole portions 46. Accordingly, the extension 24 is relatively slid to the outer side in the width direction of the vehicle with respect to the rivets 38 by following the extension (thermal expansion) of the roof panel 16 during the ED coating drying. The thermosetting adhesive in the bonding portion 36 is cured in the state described above, and then the extension 24 and the roof reinforcement 22 are fixed to each other. Then, a force to return the extension 24 to its original position acts on the extension 24 as a result of the cooling. As a result, the roof reinforcement 22 can be intentionally deformed toward the roof panel 16. The amount of deformation of the extension 24 can be adjusted by the dimension of the long hole portion 46, and thus the surface distortion of the roof panel 16 that is attributable to the shrinkage of the mastic 50 between the roof panel 16 and the roof reinforcement 22 can be further suppressed. In addition, unnecessary deformation does not arise because the long hole portions 46 into which the respective rivets 38 are inserted are formed in the extension 24 and the extensions 24 on both sides in the width direction of the vehicle are slid similarly to each other.

In the vehicular panel structure S32, the long hole portion 46 is not disposed in the extension 24 and the long hole portion 46 is disposed in the roof reinforcement 22, which is on the side that is in contact with the head portion 38A of the rivet 38, as illustrated in FIG. 5. As a result, the inner diameter of the long hole portion 46 can be increased in accordance with the diameter of the head portion 38A of the rivet 38, and thus the surface distortion of the roof panel 16 can be absorbed even when the roof panel 16 is significantly expanded and contracted as a result of the ED coating heating.

In the vehicular panel structure S32, the roof reinforcement 22 extends in the longitudinal direction of the reinforcement 20 and its cross section orthogonal to the longitudinal direction is a closed cross section as illustrated in FIG. 4. As a result, the rigidity of the roof reinforcement 22 is higher than usual, and thus a force to offset the shrinkage of the mastic 50 between the roof panel 16 and the roof reinforcement 22 that is attributable to a decline in temperature is improved to become larger than usual.

In the vehicular panel structure S32, the linear expansion coefficient of the extension 24 is equivalent to the thermal expansion coefficient of the roof panel 16 or is equal to or smaller than the thermal expansion coefficient of the roof panel 16.

When the linear expansion coefficient of the extension is larger than the thermal expansion coefficient of the roof panel and the extension is likely to be extended during the coating heating, for example, a difference in length is unlikely to occur between the extension and the roof panel, and thus the amount of deformation of the roof reinforcement toward the roof panel is not ensured with ease. In the vehicular panel structure S32, in contrast, the linear expansion coefficient of the extension 24 is equivalent to the thermal expansion coefficient of the roof panel 16 or is equal to or smaller than the thermal expansion coefficient of the roof panel 16, and thus a difference in length is likely to occur between the extension 24 and the roof panel 16 during the coating heating. Accordingly, the amount of deformation of the roof reinforcement 22 toward the roof panel 16 can be ensured with greater ease in the vehicular panel structure S32 than in a case where the linear expansion coefficient of the extension is larger than the thermal expansion coefficient of the roof panel.

FIG. 7 is a sectional view illustrating a vehicular panel structure S200 according to a comparative example.

In the vehicular panel structure S200, circular hole portions 204 are formed in an extension 202 and the shaft portions 38B of the rivets 38 are inserted into the hole portions 204 as illustrated in FIG. 7. The extension 202 and the roof reinforcement 22 are joined to each other by the shaft portion 38B of the rivet 38 being inserted into the hole portion 204 from the extension 202 side and sandwiched by the head portion 38A and the deformation portion 38C formed by caulking on the roof reinforcement 22 side. Although the vehicular panel structure S200 has no thermosetting adhesive-based bonding portion between the extension 202 and the roof reinforcement 22, a thermosetting adhesive-based bonding portion may be disposed between the extension 202 and the roof reinforcement 22. The extension 202 is made of, for example, steel.

In the vehicular panel structure S200, the linear expansion coefficient of the roof panel 16 and the linear expansion coefficient of the roof reinforcement 22 differ from each other and this difference results in misalignment in terms of the relative positions of components during the ED coating drying. Still, a clearance to allow the misalignment is not disposed in the hole portion 204. Accordingly, the mastic 50 shrinks during the cooling after the ED coating drying, and the shrinkage of the mastic 50 results in surface distortion of the roof panel 16.

In the vehicular panel structure S32, in contrast, the long hole portions 46 are disposed in the extension 24 and the rivets 38 are respectively inserted into the long hole portions 46. As a result, the misalignment of the extension 24 during the curing of the thermosetting adhesive can be absorbed and the extension 24 and the roof reinforcement 22 can be deformed toward the roof panel 16 after the cooling. Accordingly, the surface distortion of the roof panel 16 that is attributable to the shrinkage of the mastic 50 between the roof panel 16 and the roof reinforcement 22 can be further suppressed.

Second Embodiment

Figure 8:
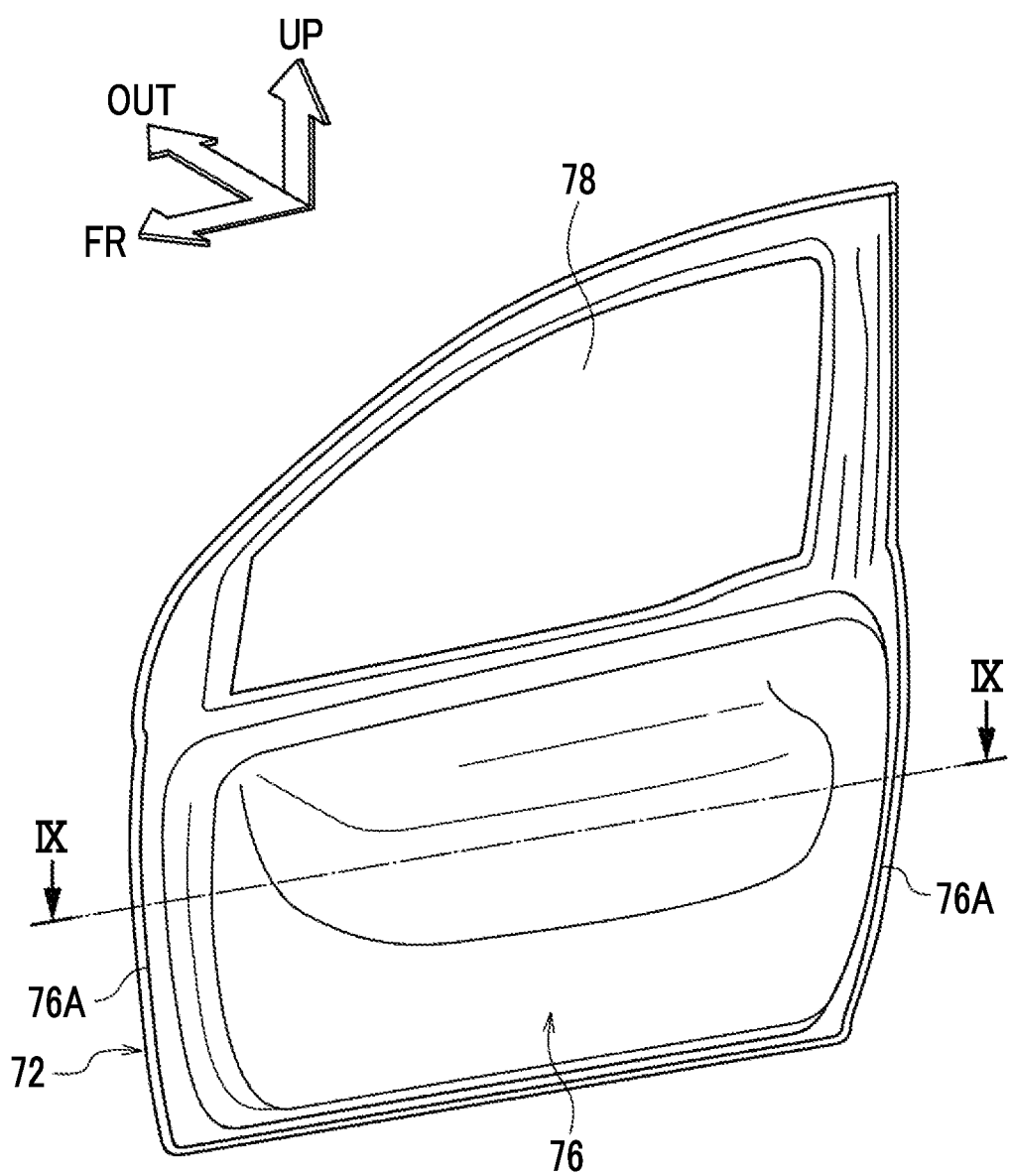
FIG. 8 is a perspective view illustrating a door structure to which a vehicular panel structure according to a second embodiment is applied.
Figure 9:
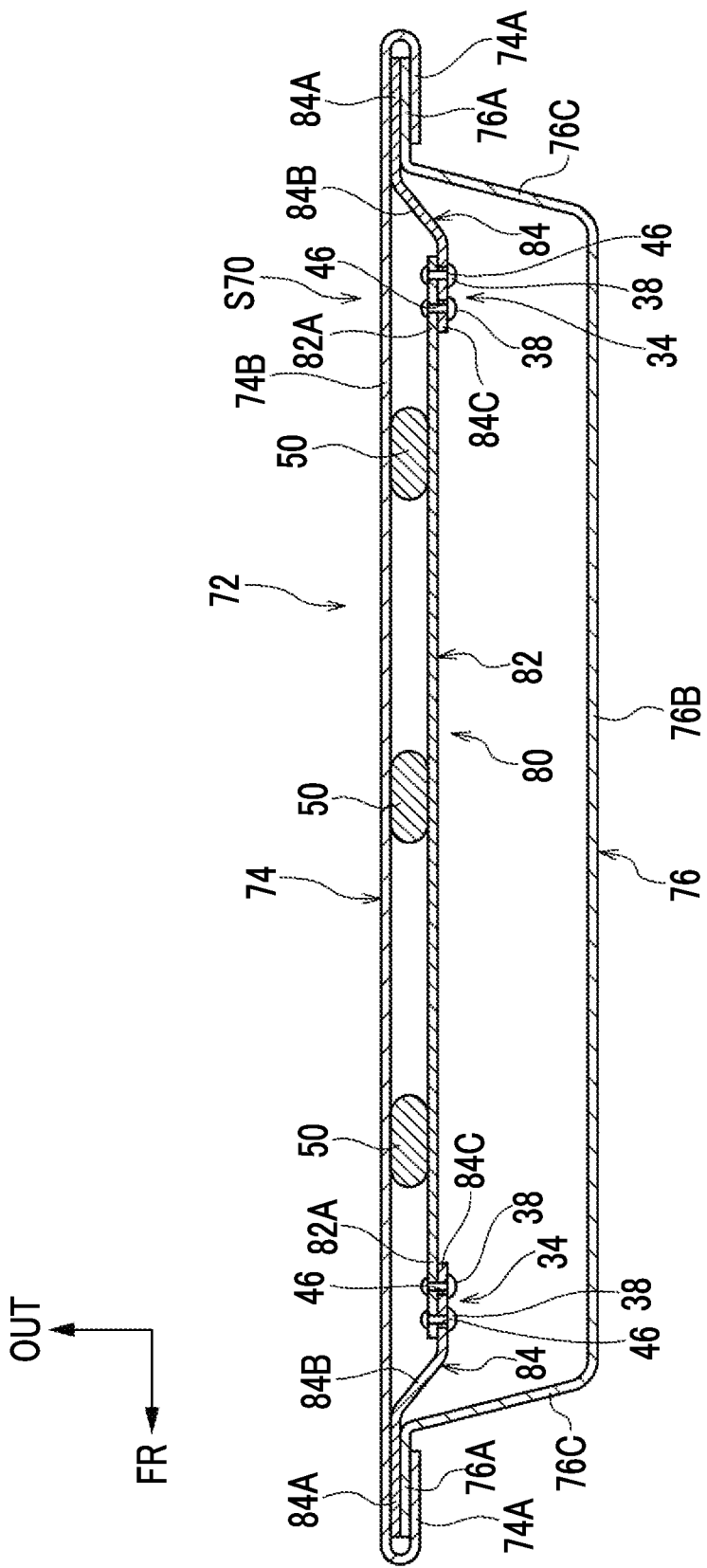
FIG. 9 is a cross-sectional view, taken along line IX-IX of FIG. 8, of the door structure to which the vehicular panel structure according to the second embodiment is applied.

A vehicle door 72 is illustrated in FIGS. 8 and 9 and a vehicular panel structure S70 according to a second embodiment is applied to the vehicle door 72. The same reference numerals will be used to refer to the same components as in the first embodiment described above, and description thereof will be omitted herein.

As illustrated in FIGS. 8 and 9, the vehicle door 72 is a front side door that is mounted on a side portion of a vehicle (not illustrated) and can be opened and closed. The vehicle door 72 is provided with a door outer panel 74 as a panel (refer to FIG. 9) and a door inner panel 76. The door outer panel 74 is disposed on the outer side in the width direction of the vehicle. The door inner panel 76 is disposed inward of the door outer panel 74 in the width direction of the vehicle. A pair of front and rear terminal portions 76A of the door inner panel 76 on the peripheral edge of the door inner panel 76 that does not include its upper end portion (door glass 78 side) is integrated by hemming processing with terminal portions 74A of the door outer panel 74 (refer to FIG. 9) on the peripheral edge of the door outer panel 74 that does not include its upper end portion. As a result, the door outer panel 74 and the door inner panel 76 form a closed cross-sectional structure (refer to FIG. 9).

As illustrated in FIG. 9, a reinforcement 80 is disposed along the front-rear direction of the vehicle in the vehicle door 72. The reinforcement 80 is provided with a door reinforcement 82 as a body portion that constitutes the middle portion of the reinforcement 80 in its longitudinal direction and a pair of front and rear extensions 84 as connection portions that constitute the longitudinal end portions of the reinforcement 80. The extensions 84 are symmetrical to each other in the front-rear direction of the vehicle.

The door outer panel 74 is provided with an outer side wall portion 74B and the terminal portions 74A. The outer side wall portion 74B is disposed substantially along the up-down direction of the vehicle and the front-rear direction of the vehicle on the outer side in the width direction of the vehicle. The terminal portions 74A are formed by the outer peripheral portions of the outer side wall portion 74B being bent.

The door inner panel 76 is provided with an inner side wall portion 76B and a pair of front and rear vertical wall portions 76C. The inner side wall portion 76B is disposed substantially along the up-down direction of the vehicle and the front-rear direction of the vehicle on the inner side in the width direction of the vehicle. The vertical wall portions 76C are bent to the outer side in the width direction of the vehicle from both end portions of the inner side wall portion 76B in the front-rear direction of the vehicle. The door inner panel 76 is also provided with the terminal portions 76A. The terminal portions 76A are bent in the front-rear direction of the vehicle from the end portions of the vertical wall portions 76C that are on the outer side in the width direction of the vehicle.

A plate-shaped member that substantially has the front-rear direction of the vehicle as its longitudinal direction constitutes the extension 84. The extension 84 is provided with a mounting portion 84A that is sandwiched between the outer side wall portion 74B of the door outer panel 74 and the terminal portion 76A of the door inner panel 76. The extension 84 is also provided with an inclined portion 84B and a bent portion 84C. The inclined portion 84B extends obliquely from the mounting portion 84A to the inner side in the width direction of the vehicle. The bent portion 84C extends along the door reinforcement 82 from the inclined portion 84B.

A plate-shaped member that substantially has the front-rear direction of the vehicle as its longitudinal direction constitutes the door reinforcement 82. End portions 82A of the door reinforcement 82 that are on the front side of the vehicle and the rear side of the vehicle are joined to the bent portions 84C of the extensions 84 that are on the front side of the vehicle and the rear side of the vehicle by joining portions 34, respectively. As in the case of the first embodiment, the joining portion 34 is provided with a bonding portion (not illustrated) and a plurality of rivets 38. The bonding portion allows the extension 84 and the door reinforcement 82 to be bonded to each other by a thermosetting adhesive. The extension 84 and the door reinforcement 82 are joined to each other by the rivets 38. Long hole portions 46 are formed in the extension 84 and the rivets 38 are inserted into the long hole portions 46. The reinforcement 80 in the vehicular panel structure S70 according to the second embodiment is shaped such that it protrudes to the side opposite to the door outer panel 74.

In the vehicular panel structure S70, mastic 50 is disposed in a plurality of places between the door reinforcement 82 and the outer side wall portion 74B of the door outer panel 74. The door reinforcement 82 and the outer side wall portion 74B of the door outer panel 74 are bonded to each other by the mastic 50.

The linear expansion coefficient of the door reinforcement 82 is smaller than the linear expansion coefficient of the door outer panel 74. In the second embodiment, the door reinforcement 82 is made of, for example, steel. In the second embodiment, the door outer panel 74 is made of carbon fiber reinforced plastic (CFRP) or the like.

The linear expansion coefficient of the extension 84 in the vehicular panel structure S70 is equivalent to the thermal expansion coefficient of the door outer panel 74 or is equal to or smaller than the thermal expansion coefficient of the door outer panel 74. In the second embodiment, the extension 84 is made of carbon fiber reinforced plastic (CFRP) or the like.

In the above-described vehicular panel structure S70, the long hole portions 46 are disposed in the extension 84 and the rivets 38 are inserted into the respective long hole portions 46. Accordingly, the extension 84 is relatively slid to the outer side in the front-rear direction of the vehicle with respect to the rivets 38 by following the extension (thermal expansion) of the door outer panel 74 during ED coating drying. The thermosetting adhesive in the bonding portion (not illustrated) is cured in the state described above, and then the extension 84 and the door reinforcement 82 are fixed to each other. Then, a force to return the extension 84 to its original position acts on the extension 84 as a result of cooling. As a result, the door reinforcement 82 can be intentionally deformed toward the door outer panel 74. The amount of deformation of the extension 84 can be adjusted by the dimension of the long hole portion 46, and thus the surface distortion of the door outer panel 74 that is attributable to shrinkage of the mastic 50 between the door outer panel 74 and the door reinforcement 82 can be further suppressed.

Third Embodiment

Hereinafter, a vehicular panel structure according to a third embodiment will be described with reference to FIGS. 10 and 11. The same reference numerals will be used to refer to the same components as in the first embodiment described above, and description thereof will be omitted herein.

The third embodiment is characterized by the materials of the elements of the vehicular panel structure S32 and a specific numerical value (dimension) for the long hole portion 46 being specified.

According to the first embodiment described above, the roof panel 16 is formed of a steel plate or the like as described above. However, in the third embodiment, a roof panel 16 is formed of an aluminum alloy plate. The linear expansion coefficient of the aluminum alloy plate that is used for the roof panel 16 according to the third embodiment is approximately 23 [$10^{-6}$/° C.].

A roof reinforcement 22 of a reinforcement 20 is made of carbon fiber reinforced plastic (CFRP) as in the case of the first embodiment. The linear expansion coefficient of the CFRP is approximately 4 [$10^{-6}$/° C.]. An extension 24 is formed of a steel plate as in the case of the first embodiment. The linear expansion coefficient of the steel plate is approximately 17.5 [$10^{-6}$/° C.].

Figure 10:
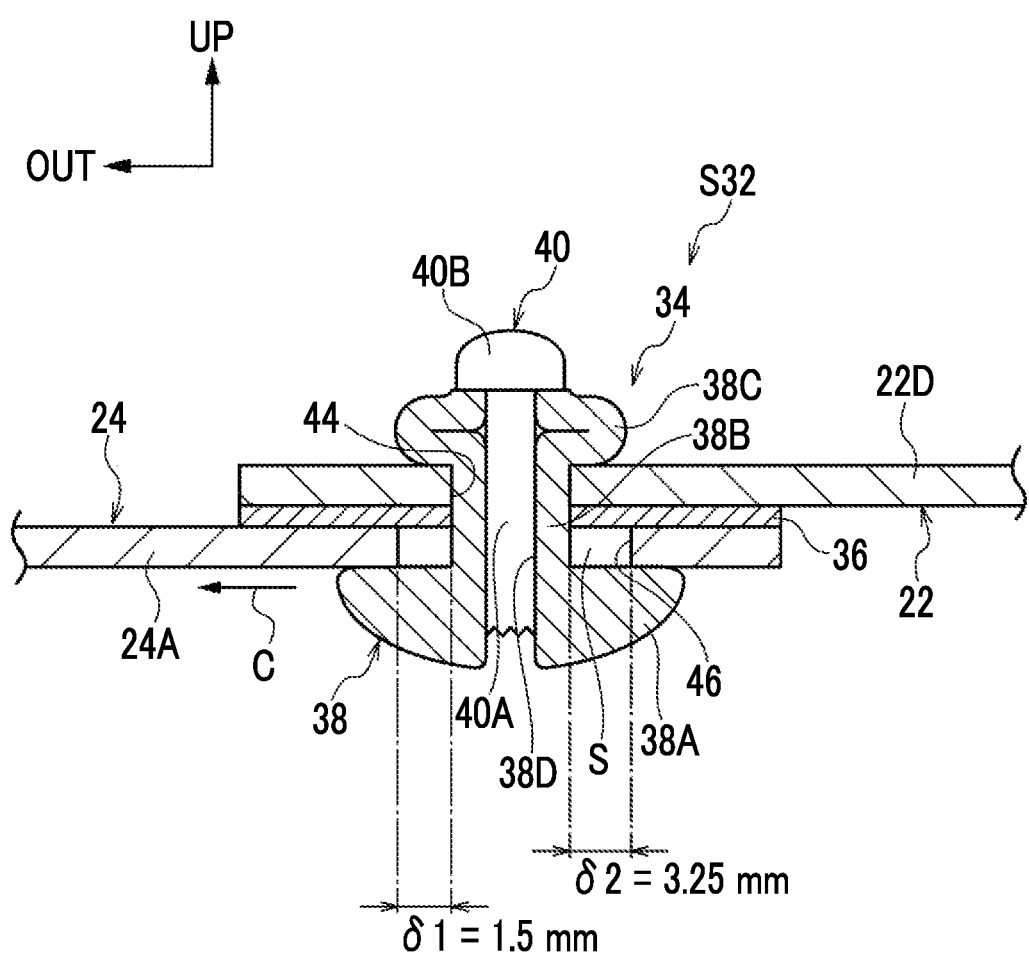
FIG. 10 is a sectional view illustrating a joining portion for an extension and a roof reinforcement used in a vehicular panel structure according to a third embodiment.
Figure 11:
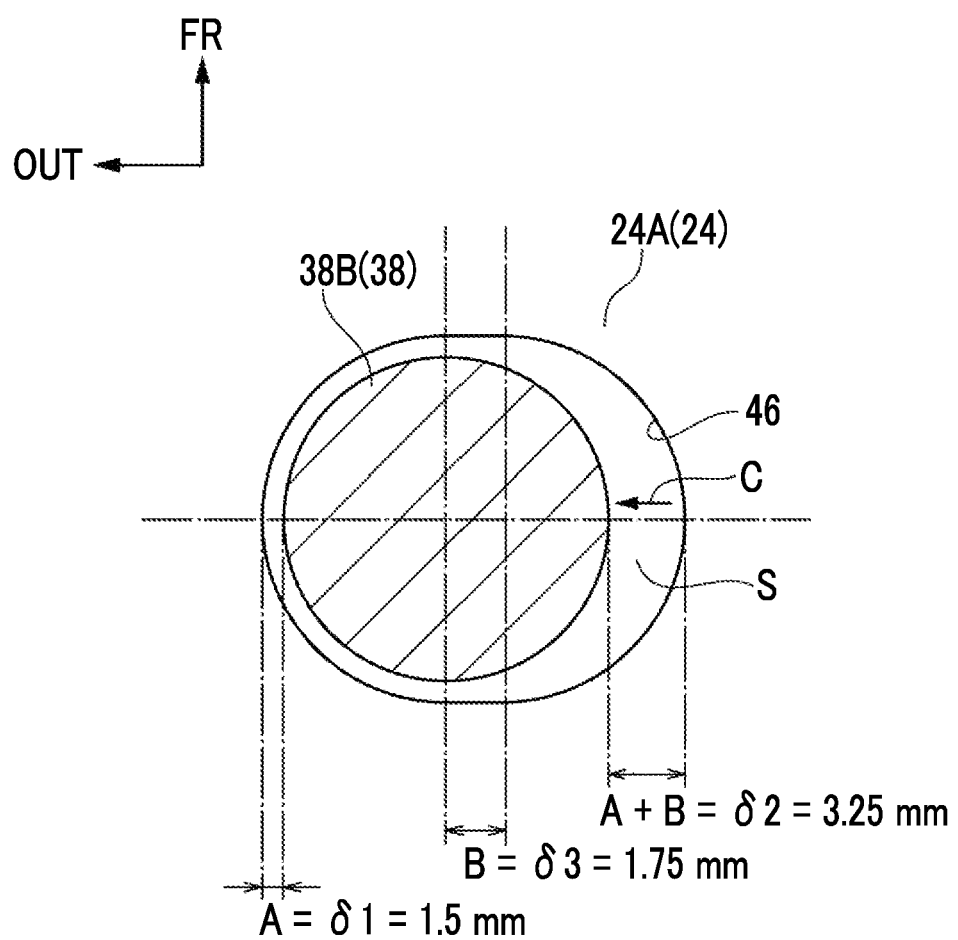
FIG. 11 is a sectional view illustrating a dimensional relationship between a long hole portion of the extension and a shaft portion of a rivet in the joining portion.

As illustrated in FIGS. 10 and 11, a gap δ1 is, for example, 1.5 mm. The gap δ1 corresponds to the gap A for absorbing the dimensional variation (positional variation) described in the first embodiment. A gap δ2 corresponds to the gap A+B for absorbing the distortion during the ED coating drying and is, for example, 3.25 mm. In other words, in the example described above, a gap δ3 corresponds to the gap B and is 1.75 mm. The gap B, which has been described in the first embodiment and is illustrated in FIG. 6B, is to allow the movement (that is, sliding) of the extension 24 during the ED coating drying (case where the heating is performed at 200° C.). The component length in the W direction (length of the roof panel 16 in the width direction of the vehicle) is 1,050 mm and the ED heating temperature is 23° C. to 200° C. during the calculation of the numerical values of the gap δ1, the gap δ2, and the gap δ3. Herein, 23° C. means a normal temperature and is the temperature of the adhesive during the drying.

The configuration described above is similar in action and effect to the first embodiment described above. In other words, a shaft portion 38B of a rivet 38 has a maximum sliding amount of approximately 1.75 mm in a case where the roof panel 16 is made of an aluminum alloy, the roof reinforcement 22 of the reinforcement 20 is made of CFRP, the extension 24 of the reinforcement 20 is made of a steel plate, and the coating drying (heating) is performed at 200° C. Accordingly, the distortion of the roof panel 16 during the ED coating drying can be sufficiently absorbed by the gap B (=δ3) being set to approximately 1.75 mm, which is equivalent to the sliding amount.

The vehicular panel structure according to the aspect of the present disclosure is not limited to the vehicular panel structures S32, S70 according to the first to third embodiments and may be disposed at the other vehicle parts. For example, the vehicular panel structure according to the aspect of the present disclosure can be applied to a back door, a hood, and so on.

In the vehicular panel structures S32, S70 according to the first to third embodiments, the long hole portions 46 are formed in the extensions 24, 84. However, an applicable embodiment of the present disclosure is not limited thereto. The long hole portions 46 may be formed in the roof reinforcement 22 and the door reinforcement 82 as well.

In the vehicular panel structures S32, S70 according to the first to third embodiments, the linear expansion coefficients of the extensions 24, 84 are equivalent to the thermal expansion coefficient of the roof panel 16 or the door outer panel 74. However, an applicable embodiment of the present disclosure is not limited to the configuration described above. Alternatively, the extensions 24, 84 may be formed by a material being used that has a linear expansion coefficient which is equal to or smaller than the thermal expansion coefficient of the roof panel 16 or the door outer panel 74.

What is claimed is:
1. A vehicular panel structure comprising:
  a panel that is part of a vehicle;
  an elongated reinforcement disposed inward of the panel with respect to the vehicle and shaped such that the reinforcement protrudes toward the panel or away from the panel; and
  mastic that is disposed between the panel and the reinforcement and that bonds the panel and the reinforcement to each other, wherein:
  the reinforcement includes a body portion, a connection portion, and a joining portion;
  an elongated hole is disposed in the reinforcement and is elongated in a longitudinal direction of the reinforcement;
  the body portion constitutes a middle portion of the reinforcement in the longitudinal direction of the reinforcement;
  a linear expansion coefficient of the body portion is smaller than a linear expansion coefficient of the panel;
  the connection portion constitutes an end portion of the reinforcement in the longitudinal direction;
  the connection portion is joined to the panel directly or indirectly via a member;

the joining portion includes a thermosetting adhesive and a fastener that join the body portion to the connection portion;

the elongated hole is disposed in either the body portion or the connection portion; and the fastener is inserted through the elongated hole and the thermosetting adhesive is disposed between overlapping sections of the body portion and the connection portion.

2. The vehicular panel structure according to claim 1, wherein:

the fastener is a rivet having a head portion; and the elongated hole is disposed on a side of the body portion and the connection portion that contacts the head portion.

3. The vehicular panel structure according to claim 1, wherein:

the body portion extends in the longitudinal direction of the reinforcement; and a cross section of the body portion orthogonal to the longitudinal direction is a closed cross section.

4. The vehicular panel structure according to claim 1, wherein a linear expansion coefficient of the connection portion is equivalent to a thermal expansion coefficient of the panel or is equal to or smaller than the thermal expansion coefficient of the panel.

* * * * *